United States Patent
Shima et al.

(10) Patent No.: US 6,456,714 B2
(45) Date of Patent: *Sep. 24, 2002

(54) APPARATUS AND METHOD FOR INTERFACING BETWEEN MULTIMEDIA NETWORK AND TELECOMMUNICATIONS NETWORK

(75) Inventors: Hisato Shima, Sunnyvale, CA (US); Sho Kou, Saratoga, CA (US); Chenchu Chilamakuri, Fremont, CA (US); Qi Benjamin Hu, Santa Clara, CA (US); Ratna Vemuri, San Jose, CA (US)

(73) Assignees: Sony Corporation, Park Ridge, NJ (US); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,878

(22) Filed: Mar. 18, 1999

(51) Int. Cl.[7] .................................................. H04M 1/00
(52) U.S. Cl. .............................. 379/399.01; 379/93.05; 370/431
(58) Field of Search ............................. 379/399, 93.05, 379/92.04, 93.01, 93.09, 399.01; 375/222, 260; 370/431, 329, 341

(56) References Cited

U.S. PATENT DOCUMENTS

| 5,479,447 | A | * | 12/1995 | Chow et al. ................. 375/260 |
| 5,787,259 | A | | 7/1998 | Haroun et al. ......... 395/200.83 |
| 5,852,655 | A | | 12/1998 | McHale et al. ........... 379/93.14 |
| 5,951,637 | A | * | 9/1999 | Kuzma ................... 379/202.01 |
| 5,987,061 | A | * | 11/1999 | Chen ........................... 375/222 |
| 5,991,520 | A | * | 11/1999 | Smyers et al. ............... 395/280 |
| 6,047,006 | A | * | 4/2000 | Brakefield et al. ....... 379/93.09 |
| 6,125,127 | A | * | 9/2000 | Smith, Jr. ................. 379/93.05 |
| 2002/0012353 | A1 | * | 1/2002 | Gerszberg et al. .......... 370/419 |

OTHER PUBLICATIONS

Written Opinion From PCT/US00/06931.

* cited by examiner

*Primary Examiner*—Fan Tsang
*Assistant Examiner*—Ovidio Escalante
(74) *Attorney, Agent, or Firm*—Finnegan, Henderson, Farabow, Garrett & Dunner, LLP (57) ABSTRACT

Systems and methods consistent with the present invention include a peripheral device connected to a telecommunications network via a telephone line and connected to a multimedia network via a high-speed serial interface. The peripheral device establishes and maintains multiple logical connections between devices in the multimedia network and devices in the telecommunications network.

15 Claims, 8 Drawing Sheets

APPARATUS AND METHOD FOR INTERFACING BETWEEN MULTIMEDIA NETWORK AND TELECOMMUNICATIONS NETWORK

BACKGROUND OF THE INVENTION

The present invention relates generally to telephone-based interfaces with telecommunications networks, and more particularly, to methods and systems for connecting a telecommunications network to a network having devices coupled through a high speed digital bus.

In standard telephone service, sometimes referred to as "plain old telephone service" or "POTS," peripheral devices (e.g., telephones, modems, etc.) transmit analog voice signals over copper wire telephone lines to a telephone office, such as a local area telephone exchange. At the exchange, the analog signal is converted to a 64-Kbps (kilobits per second) digital signal. Generally, conventional telephone service is thereafter restricted to a speed of 64 Kbps.

This standard telephone service suffers several disadvantages. First, the slow-speed and low bandwidth of conventional telephone service makes it impossible to access more than one outside telecommunications network at a time. For example, a user could not talk on the telephone while surfing the Internet. The only currently available solution is to physically install a second telephone line. Second, current telephone service is physically inflexible. For example, a user desiring access to outside telecommunications networks from an additional room in a house must physically install an additional length of copper wire telephone line and a telephone jack to that room.

New wide band services have been developed to allow more data to be transmitted over existing copper wire telephone lines than standard telephone service. Examples of wide band services include the digital subscriber line (xDSL) standard and the Integrated Services Digital Network (ISDN). The xDSL standard, which employs defined modulation techniques to digitally pack data onto the copper wire telephone lines, supports data rates of greater than 1 Mbps (mega bits per second). More information about the xDSL standard and ISDN is available from the International Telecommunications Union (ITU). These new services, while a step in the right direction, do not solve the above noted problems with standard telephone service.

Recent advances in digital bus technology make possible the interconnection of a variety of consumer electronic devices to form a multimedia network. One such digital bus technology is the IEEE-1394 digital interface standard, which enables data communications of greater than 100 Mbps among consumer electronic devices, such as video camcorders, electronic still cameras, video cassette recorders, personal computers, and any other digital audio/visual equipment that include a serial interface. More complete information regarding the IEEE-1394 standard is available from the Institute of Electrical and Electronics Engineers (IEEE).

Figure 1:
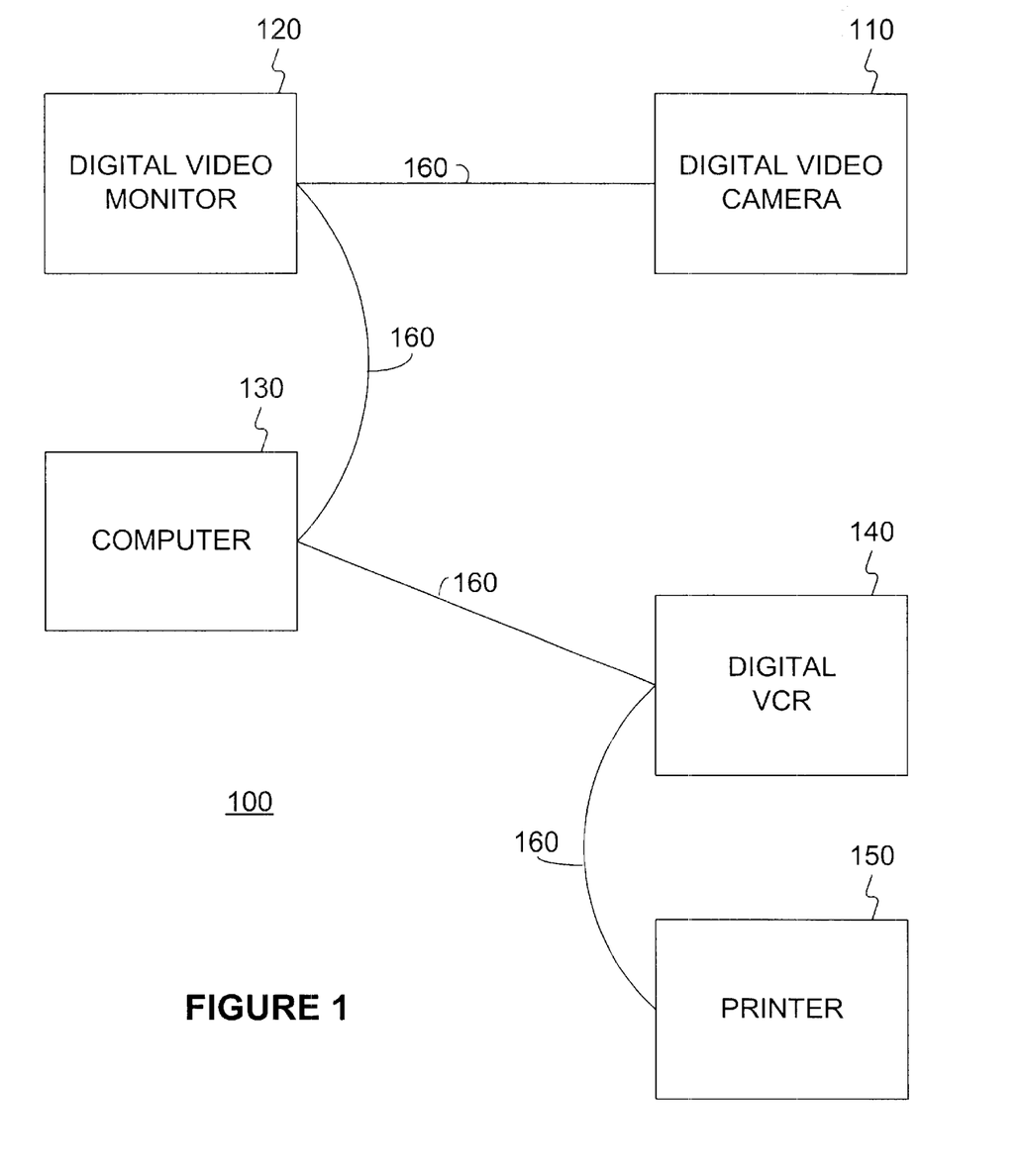
FIG. 1 is a block diagram of a conventional network of devices coupled through a high-speed serial bus.

FIG. 1 is a block diagram of a typical multimedia network 100, including various consumer electronic devices 110–150 coupled through a high-speed serial bus 160. The high-speed serial bus 160 may be, for example, an IEEE 1394 bus. Generally, the multimedia network 100 is located in one physical building, such as a home or an office. The exemplary multimedia network 100 in FIG. 1 includes digital video camera 110, digital video monitor 120, personal computer 130, digital VCR 140, and printer 150. The high-speed serial bus 160 supports communication of digital audio/video data and computer transmission data between the network devices. One disadvantage of multimedia network 100 is that consumer electronics devices 110–150 cannot access devices in an outside telecommunications network and vice versa.

SUMMARY OF THE INVENTION

Systems and methods consistent with the present invention overcome the above and other disadvantages in conventional telephone service and home multimedia networks by providing multiple logical connections between an outside telecommunications network and a multimedia network having devices coupled through a high-speed digital bus. In particular, a system consistent with the present invention includes a peripheral device connected to a telephone network through a telephone line and connected to a multimedia network through a high-speed serial bus. The peripheral device establishes and maintains multiple logical connections between devices in the multimedia network and devices in the telecommunications network.

A method consistent with the present invention connects a multimedia network having devices coupled through a high-speed digital bus to an outside telecommunications network. In particular, a peripheral device receives a call request. The peripheral device then determines whether sufficient bandwidth is available to establish and maintain the requested connection. If so, the peripheral device allocates bandwidth to the requested connection.

The foregoing general description and the following detailed description are exemplary only and should not restrict the scope of the claimed invention. Both are intended to provide examples and explanations to enable others to practice the invention. The accompanying drawings, which form part of the specification, illustrate presently preferred embodiments of the invention and, together with the following detailed description, explain the principles of the invention.

DETAILED DESCRIPTION OF THE INVENTION

Reference will now be made to preferred embodiments of the invention, examples of which are illustrated in the accompanying drawings. Where appropriate, the same reference numerals refer to the same or similar elements.

In accordance with systems and methods consistent with the present invention, a peripheral device facilitates multiple logical connections between a multimedia network having multiple consumer electronic devices coupled though a high-speed serial bus and an outside telecommunications network. Using high-speed serial bus standards (e.g., the IEEE-1394 standard) as well as wide band services available on the telecommunications network (e.g., xDSL standards), the peripheral device is capable of establishing, maintaining and disconnecting the multiple logical connections between the devices in multimedia network and the devices in the outside telecommunications network through a single telephone line.

Figure 2:
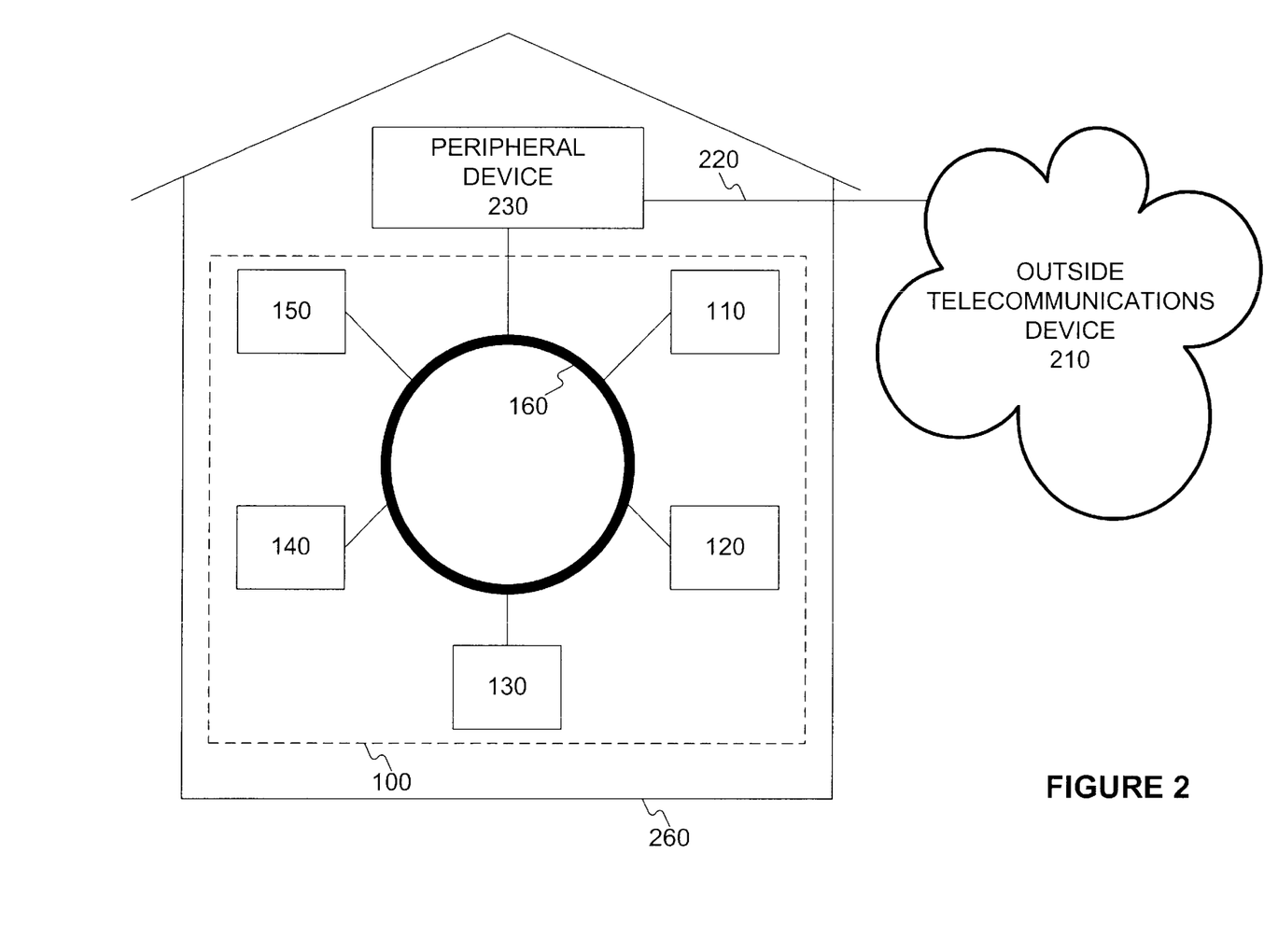
FIG. 2 is a block diagram of telecommunications system including a telecommunications network coupled to a multimedia network through a peripheral device consistent with the present invention.

FIG. 2 is a high-level block diagram of a communications system in accordance with an embodiment of the present invention. The communications system includes a telecommunications network 210, a peripheral device 230, and a multimedia network 100. Line 260 is used to indicate that peripheral device 230 and network 100 are preferably, although not necessarily, housed together in the user's home or office.

Telecommunications network 210 may be any type of voice or data network, synchronous or asynchronous. For example, telecommunications network 210 may be a POTS network, a cable network, or the Internet. Telecommunications network 210 interfaces with peripheral device 230 via a media, such as a telephone line 220.

Peripheral device 230 may include, for example, a telephone or a modem or other telecommunications peripheral. Peripheral device 230 may include any telephone-based peripheral that is capable of performing the methods described herein. Peripheral device 230 includes a network interface which digitally packs data onto telephone line 220 using wide band services such as xDSL or ISDN. With xDSL standards, the bandwidth available in the connection between the IEEE 1394-based peripheral device 230 and telecommunications network 210 is at least 1 Mbps. As used herein, the term xDSL refers to all types of digital subscriber lines, such as asymmetric DSL (ADSL), symmetric DSL (SDSL), and high-data-rate DSL (HDSL). Peripheral device 230 also includes a serial interface, which complies with a serial interface standard for networking consumer electronic devices, for example the IEEE 1394 standard. In accordance with the IEEE 1394 standard, the bandwidth available in the connection between peripheral device 230 and multimedia network 100 is at least 100 Mbps.

Multimedia network 100 includes high-speed serial bus 160, such as an IEEE 1394 bus. As used herein, "high-speed" refers to communications of at least 10 Mbps. Multimedia network 100 includes various consumer electronic devices 110–150 coupled through the high-speed serial bus 160. Consumer electronic devices 110–150 may include, for example, a printer 110, a digital monitor 120, a video camcorder 130, an electronic still camera 140, a video cassette recorder 150, digital speakers, a personal computer, an audio actuator, a video actuator, or any other consumer electronics device that includes a serial interface which complies with a serial interface standard for networking consumer electronic devices, for example, the IEEE 1394 standard.

Figure 3:
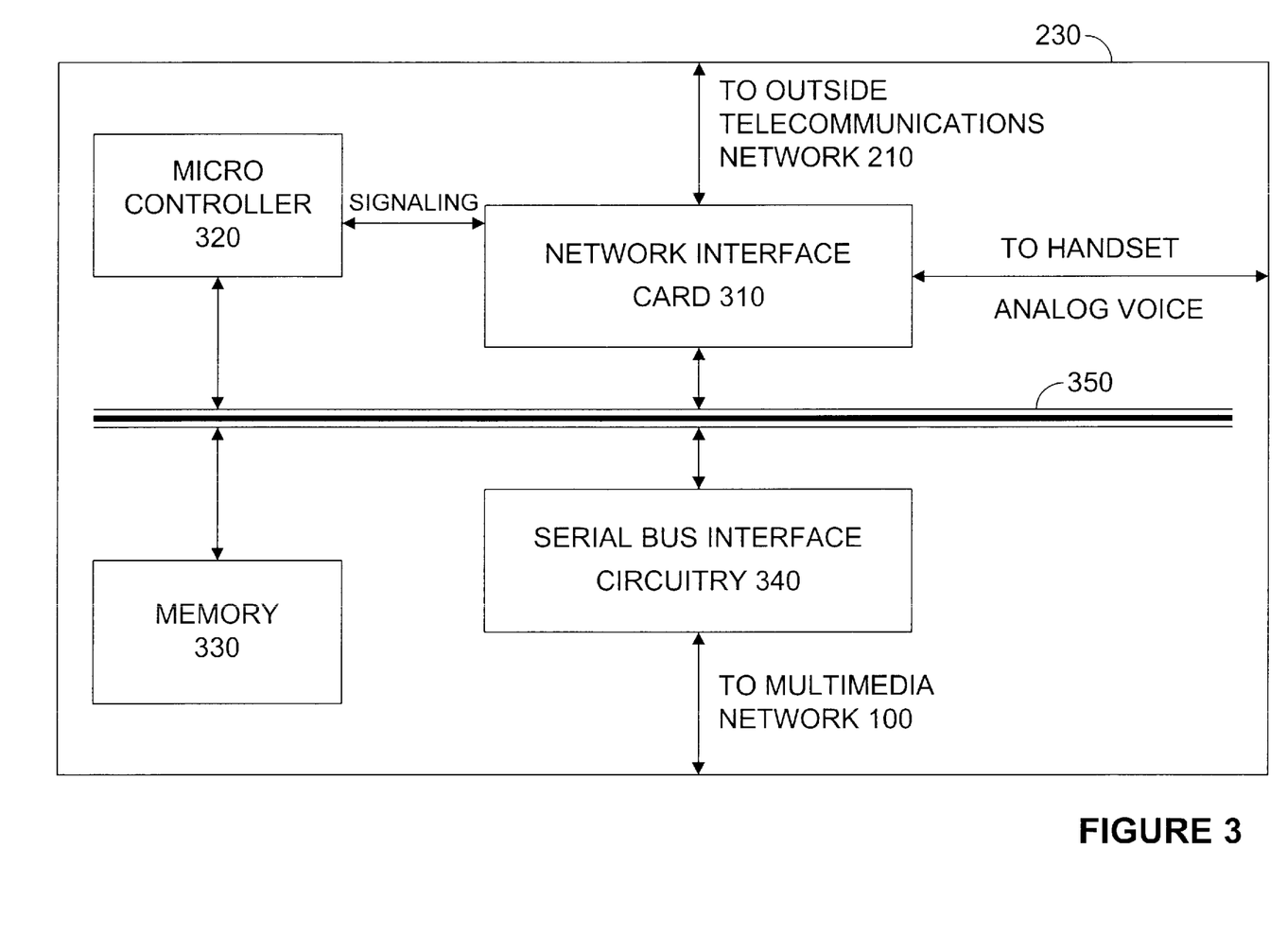
FIG. 3 is a block diagram of a peripheral device consistent with the present invention.

FIG. 3 is a block diagram of an exemplary peripheral device 230 consistent with the present invention. In this embodiment, peripheral device 230 includes a network interface card 310, a microcontroller 320, a memory 330, and a serial bus interface 340, all interconnected via an internal system bus 350.

Network interface card 310 provides physical connection to telecommunications network 210. Network interface card 310 transmits and receives data and voice signals over telephone line 220 using wide band services available on telecommunications network 210, such as xDSL. Network interface card 310 may be, for example, any available modem card capable of transmitting and receiving xDSL signals (or ISDN signals). Network interface card 310 may also receive analog voice data from an optional telephone handset (not shown).

Serial bus interface 340 complies with a serial interface standard for networking with consumer electronics devices 110–150 in multimedia network 100. For example, the serial bus interface and multimedia network may use the IEEE 1394 standard. Serial bus structure 340 thus provides the function of receiving signals from and transmitting signals to consumer electronics devices 110–150. It may be, for example, a model EHA-8945 or EHA-8940 interface available from Adaptec Corporation.

Memory 330 provides temporary storage for the voice and data signals transferred between outside telecommunications network 210 and multimedia network 100. Specifically, memory 330 buffers the digital voice and data signals received by network interface card 310 from telecommunications network 210 before the signals are transmitted by bus interface 340 to telecommunications network 100. Likewise, memory 330 buffers the digital voice and data signals received by bus interface 340 from multimedia network 100 before the signals are transmitted by network interface card 310 to telecommunications network 210. Memory 330 preferably is a DRAM, but may constitute any other high-speed read/write memory.

Microcontroller 320 preferably controls various operations of network interface card 310 and bus interface 340. For example, microcontroller 320 preferably determines whether sufficient bandwidth exists to support a requested connection and, if so, allocates bandwidth to the requested connection. Microcontroller 320 maintains a real time accounting of the amount of bandwidth currently used on high-speed serial bus 160 and telephone line 220. From this total, microcontroller 320 can calculate the remaining amount of bandwidth available for any newly requested connection. Microcontroller 320 may include a general purpose microprocessor such as a Pentium II, or may comprise a special processor specifically designed for this application.

When initially connected to multimedia network 100, peripheral device 230 identifies itself to the other consumer electronics devices in network 100 using, for example, the IEEE 1394 protocols, thereby making its services and capabilities known and available in accordance with the bus reset defined by the high-speed serial bus standard. After this bus reset procedure, consumer electronics devices 110–150 in multimedia network 100 can access devices in outside telecommunications network 210 through peripheral device 230. In addition, devices in outside telecommunications network 210 can access devices in multimedia network 100.

Figure 4:
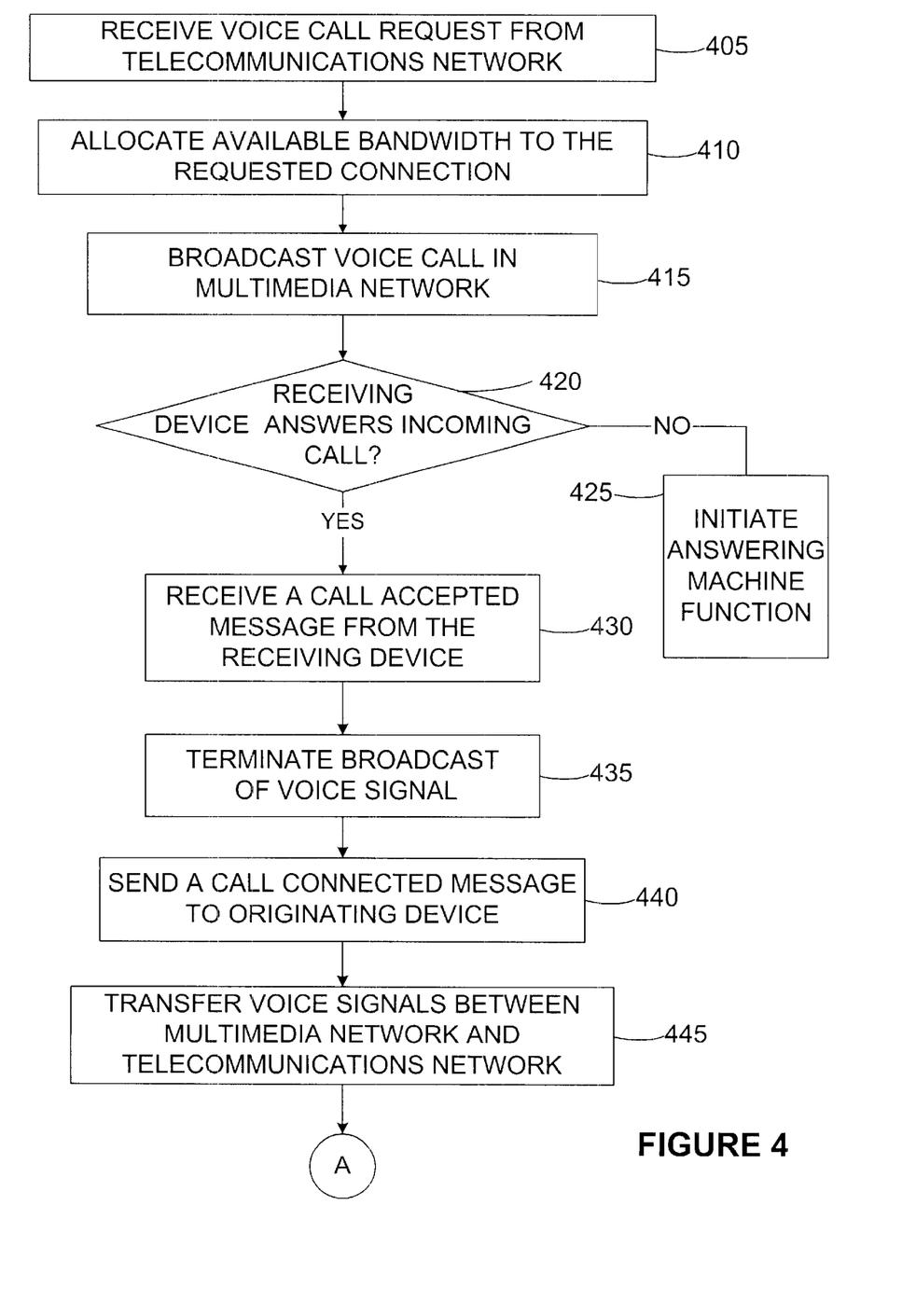
FIG. 4 is a flowchart illustrating a method consistent with the present invention for establishing and maintaining an incoming voice call from an outside telecommunications network.

FIG. 4 illustrates exemplary protocols consistent with the present invention for establishing and maintaining an incoming voice call connection between a device in telecommunications network 210 and a device in multimedia network 100. When a caller in telecommunications network 210 dials up the destination address (e.g., telephone number) assigned to multimedia network 100, peripheral device 230 receives a voice call request in accordance with, for example, xDSL standards (stage 405).

Peripheral device 230 allocates the amount of bandwidth needed to support the voice signal (e.g., 64 Kbps) to the voice connection (stage 410). Peripheral device 230 then broadcasts the voice signal by sending an incoming call indication (e.g., a ring signal) to the consumer electronics devices in multimedia network 100 (stage 415). Alternatively, peripheral device 230 sends an incoming call indication (e.g., a ring signal) to only those consumer electronics devices capable of receiving voice signals. In a preferred embodiment, peripheral device 230 uses asynchronous data transfer protocols during broadcast stage 415.

If none of the consumer electronics devices in multimedia network 100 answer the incoming call indication in stage 420, peripheral device 230 initiates a voice mail or answering machine function by, for example, playing a prerecorded message and recording the caller's message for play back at a later time (stage 425).

On the other hand, if a consumer electronics device in multimedia network 100 responds to the voice call, peripheral device 230 receives a "call accepted" message from the consumer electronics device (stage 430). In response, peripheral device 230 immediately stops broadcasting the ring signal (stage 435). Peripheral device 230 then sends a "call connected" message to the originating device in telecommunications network 210 (stage 440).

After the call is connected, peripheral device 230 transfers the digital voice signals back and forth between the responding device in multimedia network 100 and the originating device in telecommunications network 210, preferably using isochronous data transfer protocols (stage 445).

Figure 5:
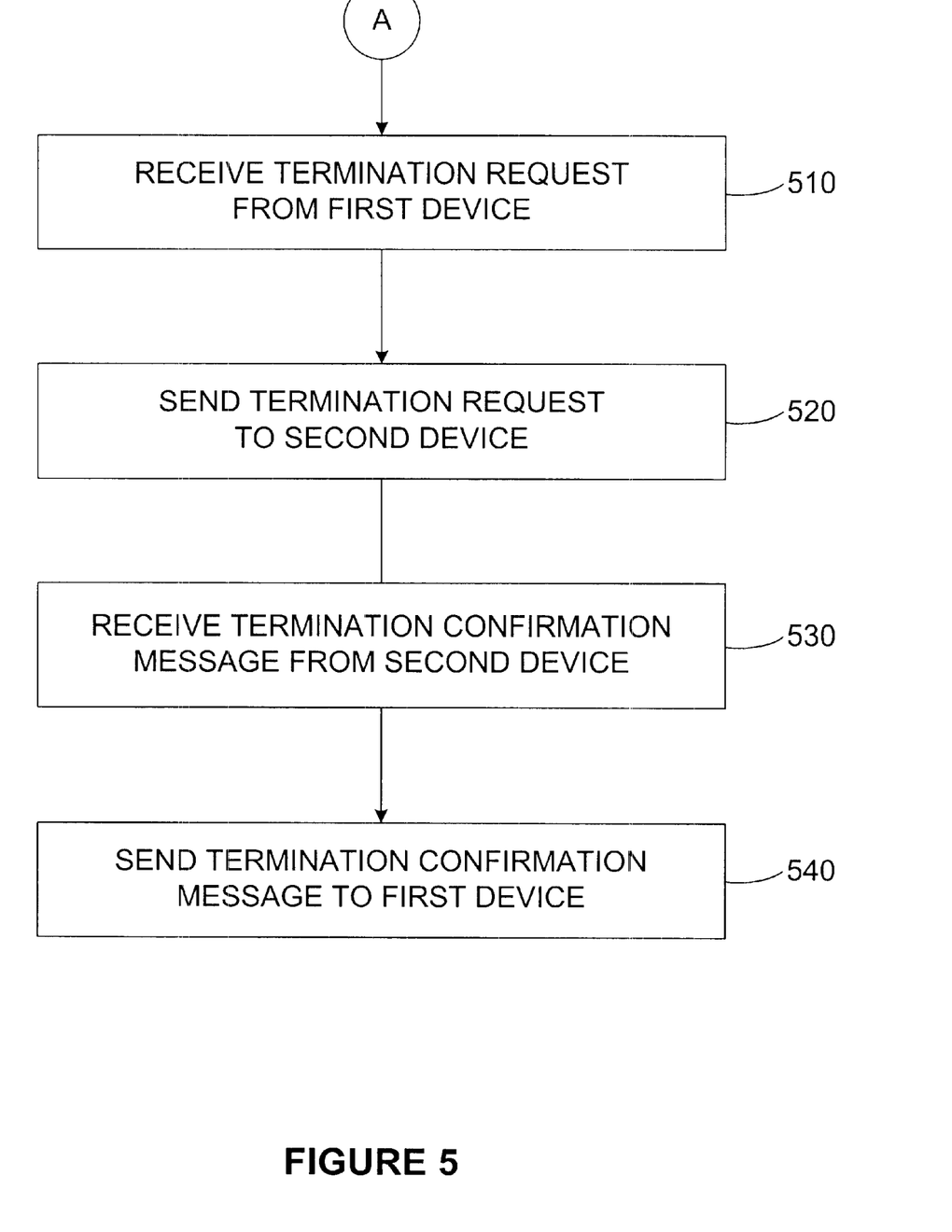
FIG. 5 is a flowchart illustrating a method consistent with the present invention for terminating a call between a multimedia network and a telecommunications network.

FIG. 5 illustrates exemplary protocols consistent with the present invention for disconnecting a connection between a device in multimedia network 100 and a device in telecommunications network 210. If either one of the two devices involved in the communication attempts to disconnect, peripheral device 230 receives a termination request (stage 510). Peripheral device 230 sends the termination request to the second device involved in the communication (stage 520). In response, the second device sends a "termination confirmation" message which is received by peripheral device 230 (stage 530). Peripheral device 230 then sends the termination confirmation message to the first device (stage 540).

Figure 6:
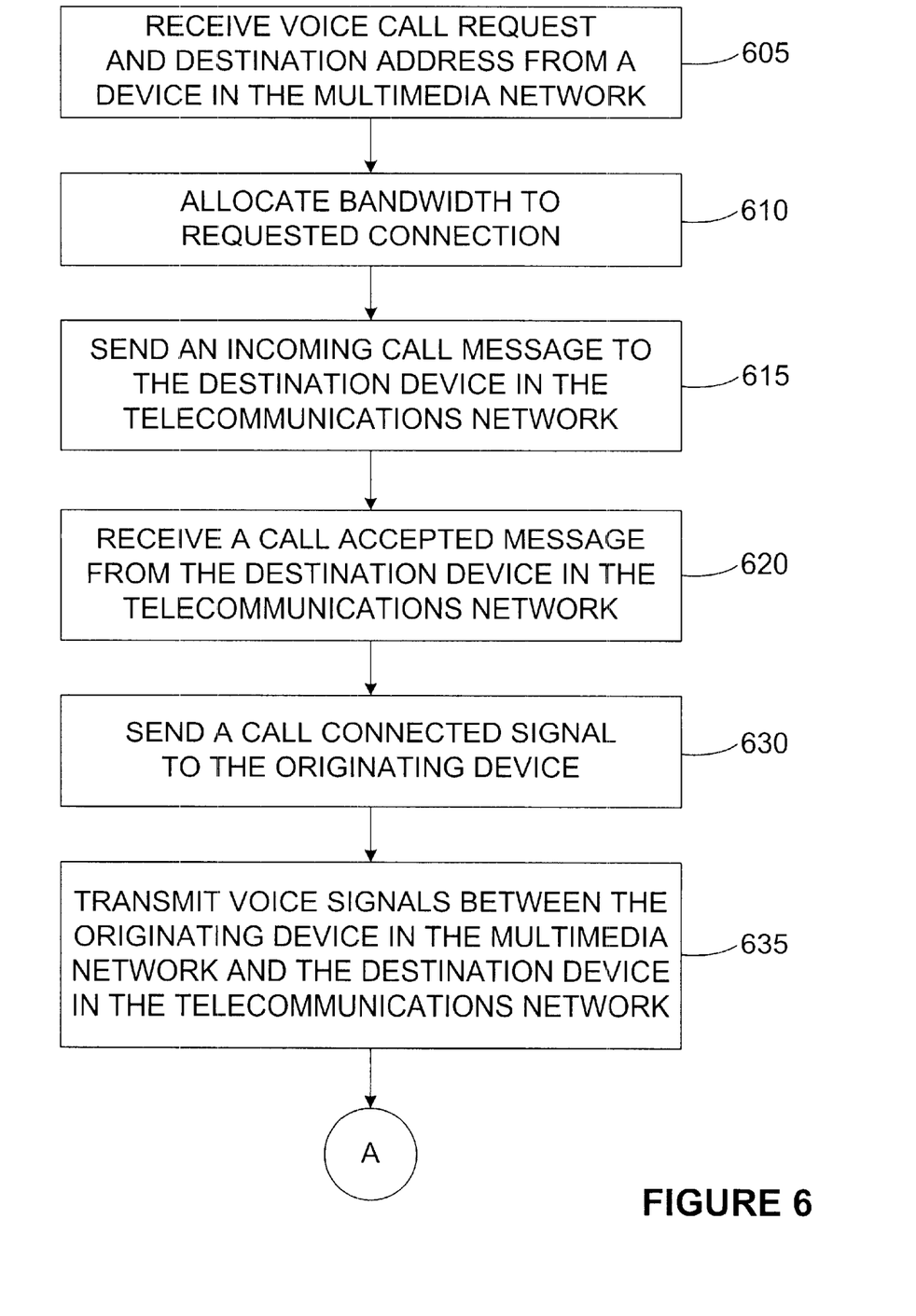
FIG. 6 is a flowchart illustrating a method consistent with the present invention for establishing and maintaining an outgoing voice call from a multimedia network to an outside telecommunications network.

FIG. 6 illustrates exemplary protocols consistent with the present invention for establishing and maintaining an outgoing voice call connection between a device in multimedia network 100 and a device in telecommunications network 210. First, one of the devices in multimedia network 100 sends an outgoing voice call request and a destination address (e.g., telephone number) to peripheral device 230 (stage 605). In response, peripheral device 230 allocates the necessary amount of available bandwidth (e.g., 64 Kbps) on serial bus 240 and on the telephone line 220 (stage 610). After allocating the minimum amount of bandwidth to the requested connection, peripheral device 230 sends an incoming call message to the destination device in telecommunications network 210 (stage 615). When the destination device accepts the call, it sends a call accepted signal which is received by peripheral device 230 (stage 620). Peripheral device 230 then sends a call connected message to the originating consumer electronics device in multimedia network 100 (stage 630).

One skilled in the art will appreciate that the destination device in outside telecommunications network 210 need not recognize the xDSL standard. Typically, the local exchange can convert digital xDSL signals into signals (such as analog signals) that the destination device can recognize.

After the call is connected, peripheral device 230 transfers the digital voice signals back and forth between the responding device in multimedia network 100 and the originating device in telecommunications network 210 (stage 635). Peripheral device 230 preferably uses isochronous data transfer protocols. If either one of the two devices involved in the communication attempts to disconnect, peripheral device 230 follows the disconnection process in FIG. 5.

Figure 7:
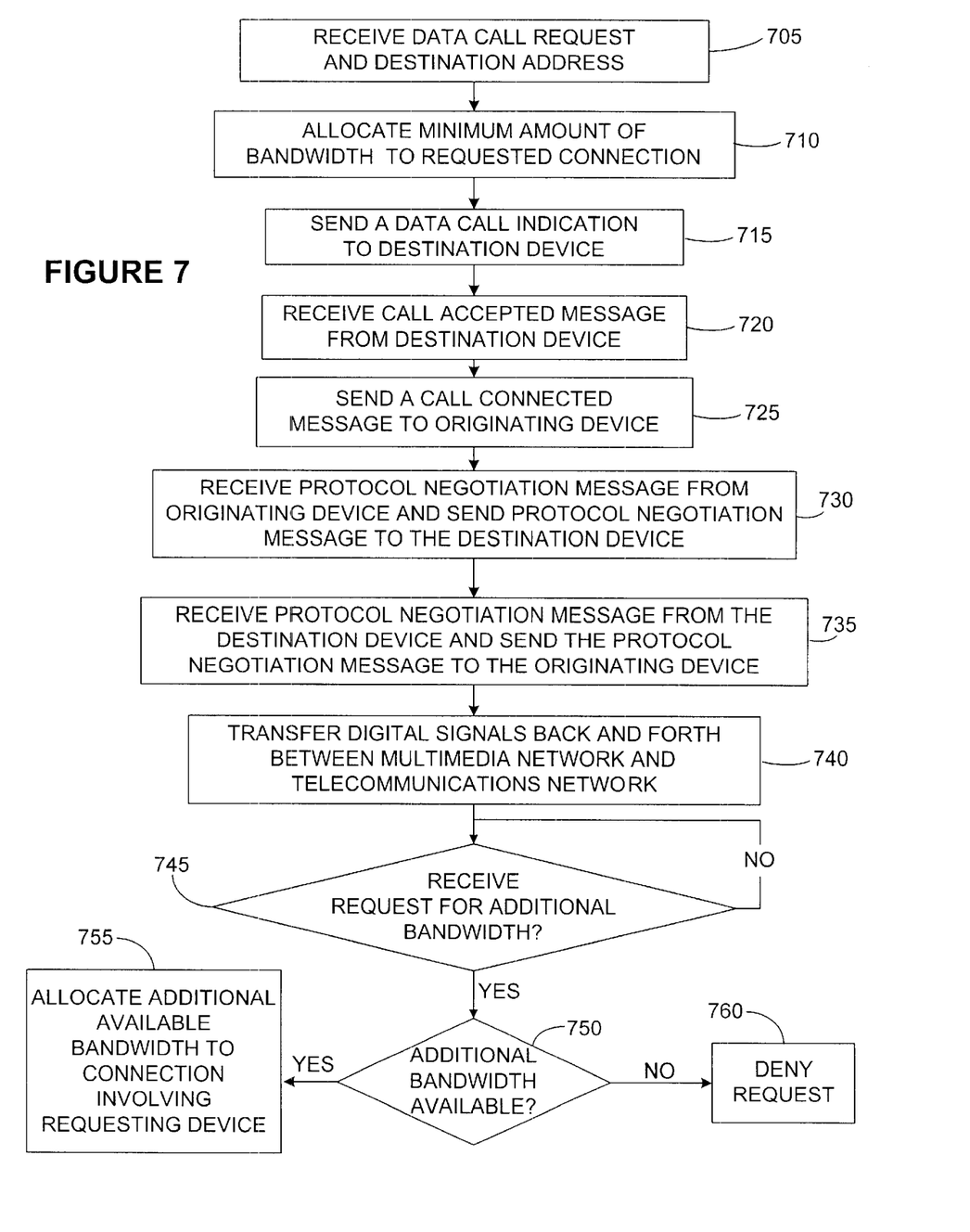
FIG. 7 is a flowchart illustrating a method consistent with the present invention for establishing and maintaining a data call between a multimedia network and an telecommunications network.

FIG. 7 illustrates exemplary protocols consistent with the present invention for establishing and maintaining data communications between multimedia network 100 and telecommunications network 210. First, the originating device (whether in multimedia network 100 or telecommunications network 210) sends a data call request and a destination address (e.g., an internet protocol or "IP" address) which is received by peripheral device 230 (stage 705). Peripheral device 230 initially allocates a pre-defined minimum amount of bandwidth (e.g., 64 Kbps) to the data communication (stage 710). After allocating the minimum amount of bandwidth, peripheral device 230 sends a data call indication to the destination device (stage 715). In response, the destination device sends a call accepted message (stage 720) which is received by peripheral device 230. In turn, peripheral device 230 sends the originating device a call connected message (stage 725).

After connection of the communication, the originating device sends a protocol negotiation message, which is received by peripheral device 230, and which indicates the originating device's capabilities in terms of speed of communication (stage 730). Peripheral device 230 then forwards the protocol negotiation message to the destination device (stage 730). In response, the destination device sends a second protocol negotiation message which is received by peripheral device 230 (stage 735). The second protocol negotiation message indicates the destination device's capabilities in terms of speed of communication. Peripheral device 230 then forwards this second protocol negotiation message to the originating device (stage 735). In this manner, peripheral device 230 assists the originating device and the destination device in determining the proper speed of communication; that is, the speed which both the originating device and the destination device can support.

After the protocol negotiation stage, peripheral device 230 transfers the digital data signals back and forth between multimedia network 100 and telecommunications network 210 (stage 740). At anytime after the protocol negotiation stage, the originating device may send a request for additional bandwidth to peripheral device 230 (stage 745). In response, peripheral device 230 determines whether the requested bandwidth is readily available (stage 750). If the bandwidth is available, peripheral device 230 allocates the additional requested bandwidth to the connection (stage 755). On the other hand, if the requested bandwidth is not available, peripheral device 230 sends the device a message denying the bandwidth request (step 760). One skilled in the art will appreciate that, when only some of the requested amount of bandwidth is available, a peripheral device consistent with the present invention might allocate a partial portion of the total amount of bandwidth requested.

Figure 8:
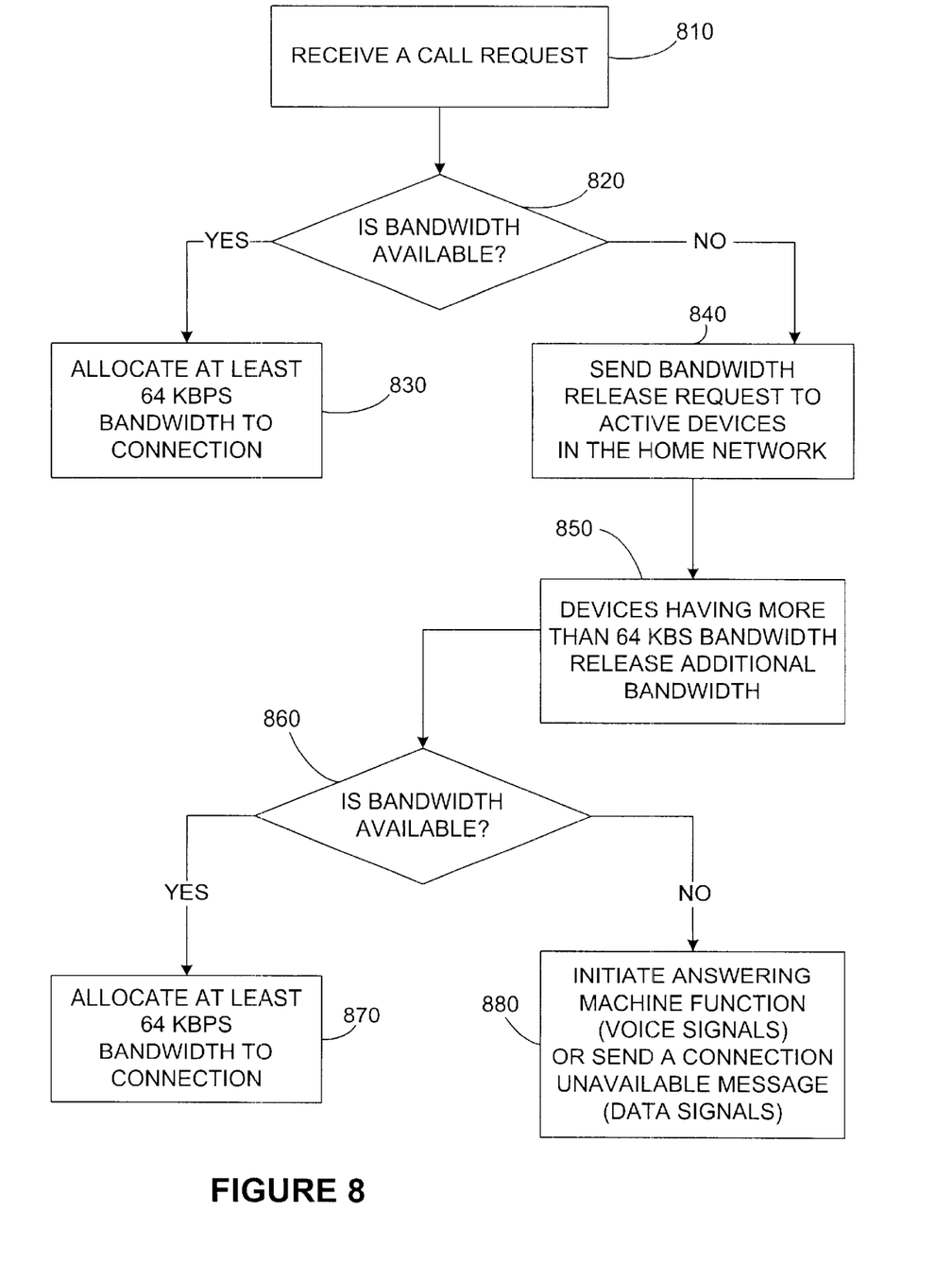
FIG. 8 is a flowchart illustrating a method consistent with the present invention for allocating bandwidth to requested connections between a multimedia network and an outside telecommunications network.

FIG. 8 is a flowchart illustrating a bandwidth allocation method consistent with the present invention. As noted above, whenever peripheral device 230 receives a call request from outside telecommunications network 210 or multimedia network 100 (stage 810), peripheral device 230 attempts to allocate bandwidth to establish the connection. In response to an incoming or outgoing call request, peripheral device 230 first determines whether the amount of bandwidth needed to support the connection (e.g., 64 Kbps) is available (stage 820). If so, peripheral device 230 allocates at least a minimum amount of bandwidth (e.g., 64 Kbps) to the connection (stage 830).

However, if the IEEE 1394-based peripheral device 230 determines that bandwidth sufficient to support the connection is not available, it sends a bandwidth release request to each of the active devices in multimedia network 100 (stage 840). Those devices in multimedia network 100 using more than the minimum amount of bandwidth (e.g., 64 Kbps) must release the additional bandwidth (stage 850). After the request and release stages, peripheral device 230 again determines whether sufficient available bandwidth exists to support the requested connection (stage 860). If so, peripheral device 230 allocates a minimum amount of bandwidth (e.g., 64 Kbps) to the connection (stage 870). In this manner, peripheral device 230 provides for dynamic reallocation of the system bandwidth.

On the other hand, if peripheral device 230 determines that there is still not sufficient bandwidth available to support the connection, peripheral device 230 initiates a voice mail or answering machine function (in the case of voice signals) or sends a connection unavailable message to the requesting device (in the case of data signals) (stage 880).

Whenever a connection between multimedia network 100 and outside telecommunications network 210 is disconnected, peripheral device 230 makes the bandwidth from the terminated connection available to both newly requested connections (through the stages in FIG. 8) and established connections. In the case of established connections, peripheral device 230 preferably transmits a message to the active devices in multimedia network 100 informing them of the availability of the additional bandwidth. In one embodiment, peripheral device gives priority to those active devices which previously were unsuccessful in requesting additional bandwidth from peripheral device 230.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A telecommunications device within a user's premises, connected via a telephone line to a telecommunications network and connected via a serial bus to a multimedia network within the users premises and including multiple consumer electronics devices coupled through the serial bus, the telecommunications device comprising:
   means for receiving a call request for a connection between the multimedia network and the telecommunications network;
   means for allocating bandwidth to the requested connection, including means for sending a bandwidth release request to at least one consumer electronic device in the multimedia network;
   means for establishing the requested connection; and
   means for sending digital signals back and forth between the multimedia network and the telecommunications network.

2. The telecommunications device of claim 1, wherein the means for receiving a call request comprises means for receiving a data call request.

3. The telecommunications device of claim 2, wherein the means for receiving a call request comprises means for receiving a voice call request.

4. The telecommunications device of claim 3, wherein the means for establishing comprises:
   means for broadcasting an incoming call indication to at least one of the consumer electronics devices in the multimedia network in response to receiving a voice call request from the telecommunications network.

5. The telecommunications device of claim 1, wherein the high-speed serial bus supports data rates of greater than 10 Mbps.

6. The telecommunications device of claim 1, wherein the high-speed serial bus is an IEEE 1394 bus.

7. The telecommunications device of claim 1, wherein the bandwidth allocation means comprises means for allocating a minimum amount of bandwidth to each established connection.

8. The telecommunications device of claim 1, wherein the bandwidth allocation means comprises:
   means for initiating an answer machine function if the amount of bandwidth needed for the connection is unavailable.

9. The telecommunications device of claim 1, wherein the bandwidth allocation means comprises:
   means for sending a connection unavailable message if the amount of bandwidth needed for the connection is unavailable.

10. A method for connecting, through a telephone line, a telephone network and a multimedia network having multiple consumer electronics devices coupled through a high-speed serial bus, the method comprising the steps of:
    receiving a call request for a connection;
    determining whether sufficient bandwidth is available to establish and maintain the requested connection;
    sending a bandwidth release request to active consumer electronics devices in the multimedia network if sufficient bandwidth is not available to establish and maintain the requested connection; and
    establishing the requested connection between the multimedia network and the telecommunications network.

11. The method of claim 10, comprising:
    initiating a telephone answer function if the active consumer electronics devices do not release a sufficient amount of bandwidth to establish and maintain the requested connection.

12. The method of claim 10 comprising:
    sending a connection unavailable message if the active consumer electronics devices do not release a sufficient amount of bandwidth to establish and maintain the requested connection.

13. An apparatus within a users premises, connected via a telephone line to a telecommunications network and connected via a serial bus to a multimedia network within the user's premises and including multiple consumer electronics devices coupled through said serial bus, the apparatus comprising:

a high-speed serial interface;

a telephone network interface connected to the telecommunications network through the telephone line; and a controller for establishing multiple simultaneous connections between the consumer electronics devices and the telecommunications network and capable of sending a bandwidth release request to at least one consumer electronic device in the multimedia network.

14. The apparatus of claim 13, wherein the high-speed serial interface supports data rates of greater than 10 Mbps.

15. The apparatus of claim 13, wherein the high-speed serial interface is an IEEE 1394 interface.

* * * * *

UNITED STATES PATENT AND TRADEMARK OFFICE
CERTIFICATE OF CORRECTION

PATENT NO. : 6,456,714 B2
DATED : September 24, 2002
INVENTOR(S) : Hisato Shima, Sho Kou, Chenchu Chilamakuri, Qi Hu and Ratna Vemuri It is certified that error appears in the above-identified patent and that said Letters Patent is hereby corrected as shown below:

<u>Column 7,</u>
Line 67, "users" should read -- user's --.

<u>Column 8,</u>
Line 28, delete "high-speed".
Line 32, delete "high-speed".

<u>Column 9,</u>
Line 3, "users" should read -- user's --.

<u>Column 10,</u>
Line 6, delete "high-speed".
Line 8, delete "high-speed".

Signed and Sealed this

Seventh Day of January, 2003

JAMES E. ROGAN
*Director of the United States Patent and Trademark Office*